United States Patent [19]

Engle

[11] 4,080,005
[45] Mar. 21, 1978

[54] EMPTY-LOAD FLUID PRESSURE BRAKE SYSTEM INCLUDING PROPORTIONING VALVE

[75] Inventor: Thomas H. Engle, Cape Vincent, N.Y.

[73] Assignee: General Signal Corporation, Rochester, N.Y.

[21] Appl. No.: 556,990

[22] Filed: Mar. 10, 1975

Related U.S. Application Data

[63] Continuation of Ser. No. 75,820, Sep. 28, 1970, abandoned.

[51] Int. Cl.² ............................................... B60T 8/18
[52] U.S. Cl. .................................. 303/22 R; 188/195; 303/23 R
[58] Field of Search ...................... 303/22, 23, 6 C, 46; 188/195

[56] References Cited

U.S. PATENT DOCUMENTS

| | | | |
|---|---|---|---|
| 2,031,213 | 2/1936 | Farmer | 303/46 X |
| 2,068,342 | 1/1937 | McClure | 303/23 R |
| 3,338,638 | 8/1967 | Kirk et al. | 303/22 R |
| 3,376,080 | 4/1968 | Kettering et al. | 303/23 A X |
| 3,425,752 | 2/1969 | Pollinger et al. | 303/23 R |
| 3,606,485 | 9/1971 | Scott | 303/23 R |
| 3,612,621 | 10/1971 | Scott | 303/22 R |

Primary Examiner—Trygve M. Blix
Assistant Examiner—Douglas C. Butler
Attorney, Agent, or Firm—Pollock, Vande Sande & Priddy

[57] ABSTRACT

Empty-load fluid pressure brake equipment for a railroad car. An automatic changeover valve is operated by the pressure developed in the controlled outlet connection of a triple valve. In the empty position of the changeover valve, a volume reservoir is placed in communication with the outlet connection and the pressure developed in that connection is supplied to the brake cylinder through a proportioning valve so that a brake cylinder pressure is developed which is a predetermined fraction of the cylinder pressure developed by the same brake pipe pressure reduction in the load position. The ratio of cylinder pressure on an empty car to that on a loaded car is constant for all applications, and the volume reservoir is sized with regard to this ratio so that the equalization pressures are the same on an empty car as on a loaded car. An initial opening bias is exerted on the proportioning valve so as to prevent proportioning action during the initial stages of brake cylinder pressure development.

5 Claims, 1 Drawing Figure

U.S. Patent
March 21, 1978
4,080,005
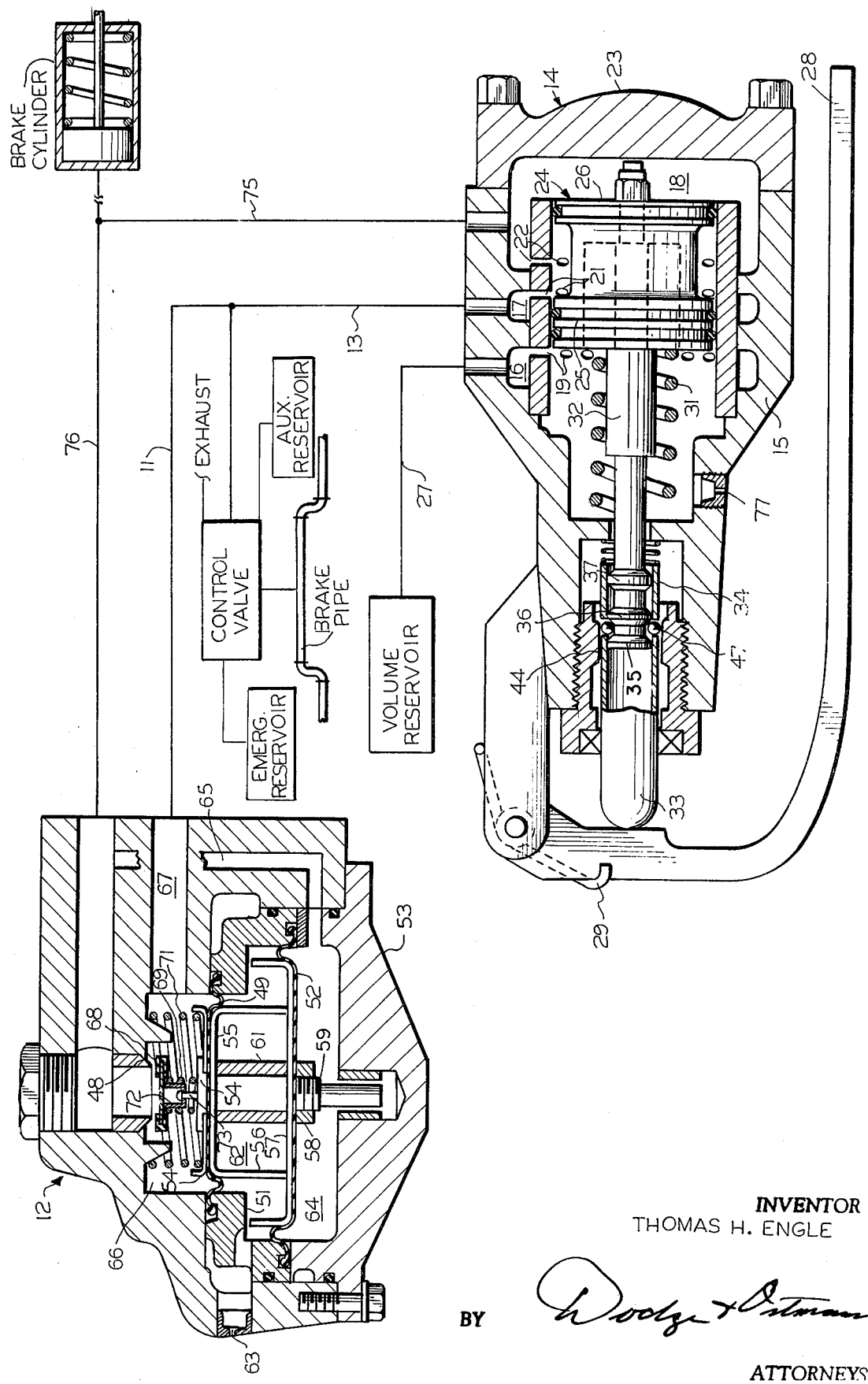
INVENTOR
THOMAS H. ENGLE
BY *Dodge & Ostman*
ATTORNEYS

EMPTY-LOAD FLUID PRESSURE BRAKE SYSTEM INCLUDING PROPORTIONING VALVE

This is a continuation of application Ser. No. 75,820, filed Sept. 28, 1970, now abandoned.

BACKGROUND OF THE INVENTION

Empty-load brake equipment is brake equipment in which the braking effort on an individual car is varied depending upon whether the car is loaded or empty. In an automatic air brake system, the brake operating motor receives air from the auxiliary reservoir under the control of a triple valve. The pressure developed in the motor depends on the amount of air delivered and the volume of the motor. It has been proposed to change the braking force by providing a volume reservoir which is arranged either to be charged by a part of the air flowing to the brake controlling motor or to be cut out of the system and vented. When this volume is connected to be charged along with the brake controlling motor, the pressure which can be developed in the motor is less than when the reservoir is cut out.

The amount of air delivered to the brake controlling motor depends upon the magnitude of the reduction of the pressure in the brake pipe up to the point at which the pressures in the reservoir and the motor have equalized. Once equalization has occurred, further reduction of brake pipe pressure will have no effect on the pressure in the brake controlling motor unless that further reduction of brake pipe pressure occurs at a rate such that an emergency application is produced.

Since the inclusion of a volumen reservoir in the charging connection of the brake operating motor increases the total volume into which the air from the reservoir may expand, it will be realized that the equalization pressure in the empty setting (volume included) will be lower than that in the load setting (volume cut out). As a result, a brake pipe pressure reduction effective to cause equalization in the load setting will not cause equalization in the empty setting. Thus, a further reduction of the brake pipe pressure will cause the pressure in the braking motors on cars in the empty setting to be increased. Commonly the engineer, when he desires a full service application of the brakes, will insure a full service application by making an over reduction. The effect of this is a loss of a proper correlation of the braking forces if empty-load brakes are in use and different settings are in effect on the cars.

According to the teachings of the U.S. McClure Pat. No. 2,068,342, dated Jan. 19, 1937, this undesirable feature can be eliminated by connecting the volume reservoir to the brake operating motor through a proportioning valve when the equipment is in the empty setting. The size of this volume reservoir is so selected that the pressure therein will equalize with the auxiliary reservoir at the same pressure which is characteristic of the brake in the load setting. In the empty setting, the brake cylinder pressure is a proportional part of the pressure in the volume reservoir as determined by the proportioning valve.

In the empty setting of his equipment, the proportioning valve of the McClure patent modifies the brake cylinder pressure throughout the time during which the volume reservoir receives fluid under pressure from the auxiliarly reservoir. In order to insure complete dissipation of the braking pressure during a brake release, McClure provided his proportioning valve with a return spring. This return spring necessarily delays the initial development of pressure in the brake cylinder. This is undesirable because the initial development of brake cylinder pressure should occur uniformly throughout the train. Control valves of the type in use in railroad freight service include a quick service feature by which an initial breaking pressure of about 10 p.s.i. is developed. Such a pressure is adequate to move the brake shoes into initial contact with the wheels.

SUMMARY OF THE INVENTION

According to the present invention the control valve and the brake operating motor are interconnected by a flow path which includes a proportioning valve which is normally biased open and a changeover valve which selectively renders the proportioning valve effective dependent upon whether the car is empty or loaded. In the car-empty setting, the changeover valve permits auxiliary reservoir pressure to be proportionately reduced by the proportioning valve. A spring biases the proportioning valve open. In the empty setting of the changeover valve, this spring delays proportioning action until the quick service brake cylinder pressure development is complete. Thereafter, the proportioning action commences and continues during the development of pressure in the volume reservoir. It will be seen that the initial brake cylinder pressure development is unaffected by the proportioning valve, and this development is not delayed on the empty cars. The quick service feature is thus preserved.

The changeover valve could be manually set in either of its two positions, but it is preferred to use an automatic valve which normally assumes the load setting but on an empty car moves to empty setting as an incident to the automatic control valve moving to service position. The automatic changeover valve includes a means to sense the interval between sprung and unsprung parts of the car, the interval being smaller on loaded cars than on empty cars.

BRIEF DESCRIPTION OF THE DRAWING

A preferred embodiment of this invention will be described having reference to the accompanying drawing in which the parts are shown in the positions assumed when the brakes are released.

DESCRIPTION OF THE EMBODIMENT

Conventional freight brake equipment includes a brake pipe, a control valve, auxiliary and emergency reservoirs, a brake cylinder and an exhaust connection all indicated by the legend in the drawing. The direct-connected brake cylinder is but one of a variety of brake operating motors in use today. It may be connected with the control valve through a relay valve or through a pneumatic-hydraulic booster. The control valve includes a controlled passage connected to the brake cylinder which serves in the release position to vent the brake cylinder through the exhaust connection. It also includes passages which connect the emergency and auxiliary reservoirs to receive fluid under pressure from the brake pipe. The brake pipe is charged to a predetermined pressure, usually about 70 p.s.i., and serves to charge the auxiliary and emergency reservoirs to that same pressure. Brake applications are made by reducing brake pipe pressure. In either partial service or full service applications of the brake, the control valve cuts off charging flow to the reservoirs and connects only the auxiliary reservoir to the brake cylinder to charge the latter. This flow terminates either when auxiliary reservoir pressure becomes equal to the reduced brake pipe pressure (partial service application) or when the auxiliary reservoir pressure equalizes with the developing pressure in the brake cylinder (full service application). In an emergency application, the brake pipe is vented at a high rate and the control valve permits the pressure in the brake cylinder to equalize with the pressures in both the auxiliary and the emergency reservoirs. In full services, a brake cylinder pressure of about 50 p.s.i. will be developed; in emergency, about 60 p.s.i. is developed.

According to the present invention, the control valve affords communication with the brake cylinder through a branch connection 11 which includes proportioning valve 12, or through a branch 13 which includes changeover valve means 14.

The changeover valve means 14 includes a body 15 having a valve bore in which annular recesses 16 and 17 and a counterbore 18 are formed. A sleeve is pressed into the bore and has radial ports 19, 21 and 22 extending therethrough. A cap 23 closes the outer end of the bore. A valve spool 24 is slidable in the sleeve. Valving lands 25 and 26 are provided on the spool 24. Annular recess 16 is connected by line 27 with the volume reservoir. A sensor foot 28 is pivotally connected to the body 15 and is biased toward the illustrated position by a spring 29. A thrust rod assembly reacts between the valve spool 24 and the sensor foot 28. A spring 31 biases the valve spool 24 toward the illustrated position. The thrust rod assembly includes a piston rod 32 connected to an end piece 33 through a detent clutch. The detent clutch includes an apertured sleeve 34 formed as a part of the end piece 33 and surrounding the end of rod 32. The rod 32 has three axially spaced cylindrical lands 35, 36 and 37 thereon. These lands are provided with conical surfaces. A cylindrical reaction surface 44 encircles the sleeve 34 and has conical ramps at its ends. Ball detents 47, retained in the apertures in the sleeve 34, hold the end piece 33 in either the extended position, as illustrated, or in a retracted position as will be described.

The proportioning valve 12 comprises a body portion in which a stepped cylindrical bore is formed. A valve seat 48 is provided at the inner end of this bore. A motor-operated valve assembly is mounted in the stepped bore and comprises an annular slack diaphragm 49 confined at its outer periphery between the step in the bore and an annular spacer 51. A second annular slack diaphragm 52 larger than diaphragm 49 is clamped at its outer periphery between the spacer 51 and a cover 53 which closes the outer end of the stepped bore. The inner periphery of diaphragm 49 is clamped between diaphragm followers 54 and 55. The follower 55 having a skirt portion 56 engages a follower 57 to form a cup-shaped piston flanged outwardly at its lower end and secured with a nut 58 adjoining the inner periphery fo diaphragm 52. A spacer sleeve 61 reacts between diaphragms 49 and 52. A central threaded member 59 coacts with nut 58 to clamp the follower members 54, 55 and 57 and sleeve 61 together. The chamber 62 between the diaphragms is connected to atmosphere through a vent 63.

The motor chamber 64 defined between the diaphragm 52 and cover 53 is connected by a passage 65 to the outlet connection of the proportioning valve. The motor chamber 66 defined in the inner end of the stepped bore by diaphragm 49 is connected by passage 67 to the controlled connection 11 of the control valve.

A spring 71 reacts between the inner end of the stepped bore and diaphragm follower 54. A rubber-faced valve disc 68 is biased toward valve seat 48 by a light spring 69. A central hasp 72 is mounted on the valve disc 68. A headed pin 73 is connected to the threaded member 59. Hasp 72 has an aperture through which pin 73 passes. As illustrated the bias of spring 71 urges the diaphragm assembly away from seat 48, and the head of pin 73 holds the valve disc 68 spaced from seat 48 despite the bias of spring 69.

The brake cylinder is controlled by pipes 75 and 76 to receive air from the control valve through the changeover valve 13 or the proportioning valve 12. In the illustrated position the volume reservoir is vented through a flow path which includes annular recess 16, ports 19 and vent port 77.

OPERATION OF THE PREFERRED EMBODIMENT

As stated earlier, the parts are shown in the positions they assume when the brakes are released. The brake pipe will be charged from the locomotive to standard running pressure, usually 70 p.s.i. The control valve in release position, permits charging air flow from the brake pipe to both the auxiliary and emergency reservoirs; thus these reservoirs are charged to 70 p.s.i. The brake cylinder is connected through the control valve to the exhaust connection.

A reduction of the pressure in the brake pipe causes the control valve to cut-off the charging flow to the auxiliary and emergency reservoirs and connects the auxiliary reservoir to the brake cylinder through connections 11, 13, 75 and 76. The valve 68 in the proportioning valve 12 will close as soon as a pressure of 10 p.s.i. develops in the brake cylinder by reason of the passageway 65 which permits this pressure to act upon the larger diaphragm 52. Simultaneously, pressure will develop in chamber 18 of the changeover valve 14 and cause spool valve 24 and the associated thrust assembly to move to the left. The thrust assembly will cause the sensor foot 28 to swing downward. On a loaded car, movement of foot 28 will be arrested by coming into contact with a stop whose position in relation to foot 28 is indicative of car loading. This arrest of foot 28 on a loaded car occurs before the land 25 uncovers ports 19. Thus there will be no flow from recess 17 to recess 16 and the volume reservoir. In this same position, the recess 17 and counterbore 18 remain in communication with one another, the land 24 not having cut off flow through the ports 22. The ball detents 47 will not pass the end of the reaction surface 44 and the end piece 33 will remain in its illustrated position. Further movement of spool 24 is prevented. During the remainder of the application, the brake cylinder will receive fluid through connection 13, recess 17, ports 21, the groove between lands 24 and 25, ports 22 and pipe 75. The volume reservoir remains vented and the proportioning valve remains closed after the initial pressure of 10 p.s.i. is developed.

On an empty or lightly loaded car, the sensor foot 28 will be free to move a greater distance between sprung and unsprung parts. The ball detents may move beyond the reaction surface 44 and are thereby released to move radially outward. This movement of the ball detents frees end pieces 33 so it moves inwardly relative to rod 32 under the bias spring 29 and the ball detents then enter the groove between collars 36 and 37 and are again confined by reaction surface 44. This permits the spool valve 24 to move far enough to interconnect recesses 16 and 17 and cut off communication between recess 17 and counterbore 18. In this position of the spool valve, the fluid under pressure from the control valve will enter the volume reservoir through the connection 27 and will also flow to the inlet connection 11 of the proportioning valve 12 urging diaphragm 49 in the valve-opening direction. Since connection 79 is now cut off from the connection 13 by the spool valve, a pressure will be developed on the small diaphragm 49 higher than that in connection 75, thus opening valve 68 and permitting flow to the brake cylinder and pipe 76. Fluid under pressure will flow from connection 76 into passage 65 and chamber 64. This pressure urges diaphragm 52 in the valve-closing direction. As the valve tends to close, the pressure in connection 76 tends to decrease, thereby causing diaphragm 52 to move in a valve-opening direction. Because of the difference in the area of diaphragms 52 and 49, the valve 68 will be closed by a pressure in connection 76 lower than that in connection 67, and thus the valve acts in a throttling manner to provide a lower pressure in connection 76 than the pressure in connection 11. The proportional relationship between these pressures when the valve is closed will depend upon the ratio of the areas of the diaphragms. This ratio is about 5:2. In a full service application an equalization pressure of 50 p.s.i. will exist in chamber 66 and the volume reservoir while a pressure of only 20 p.s.i. will be produced in the brake cylinder.

Because full equalization pressure exists in the volume reservoir, a further reduction of brake pipe pressure will have no effect on the pressure in the brake cylinders of the empty cars. Thus, the pressure in the brake cylinder of an empty car is fully developed by the same reduction of brake pipe pressure as caused full pressure development on a loaded car.

When the control valve is moved to release position by redevelopment of brake pipe pressure, the changeover valve will initially remain in empty setting if it had assumed that setting during the application. The pressure in connection 11 will be vented through the control valve's exhaust. This pressure will quickly drop below that in connection 76, and check valve 68 will open and permit vending flow from the brake cylinder. The changeover valve 14 will be reset by spring 31 when the pressure in chamber 18 is sufficiently reduced and, as an incident to resetting, the detent clutch will be restored to its illustrated position and passage 13 will be reconnected to passage 75 by ports 21 and 22, allowing the brake cylinder to exhaust directly. On a car in load setting, the exhaust function proceeds in the normal manner as 13 and 75 are interconnected by the spool valve.

I claim:

1. In combination a changeover valve for empty-load fluid pressure brakes having a load setting and empty setting the valve being biased toward its load setting; a single-acting motor effective when energized to move said valve toward empty setting; a limit stop; means driven toward said stop by energization of said motor; said stop being moved away from said motor as the load decreases; a clutch connecting said driven means with said motor and releasing said driven means when motor movement exceeds a predetermined amount; and biasing means urging said driven means away from said stop.

2. A fluid pressure brake system of the type including a changeover valve having a load and an empty setting, the system operable, when any given reduction in brake pipe pressure occurs, to remove a corresponding predetermined quantity of air from a supply reservoir and, in the load setting of the changeover valve to deliver said quantity of air to a brake operating motor and, in the empty setting of the changeover valve to deliver a part of said quantity of air to said motor through a proportioning valve and to deliver the balance of that air to a volume reservoir, the improvement comprising:
   a vent connection from said volume reservoir open when said brake system releases said brakes and closed when said valve is in empty setting,
   two paths in parallel flow relation with one another and through which said quantity of air removed from said supply reservoir may be delivered to said motor,
   one of said flow paths connecting said supply reservoir to said brake operating motor to provide at times the full pressure of the supply reservoir to the brake operating motor,
   the other of said flow paths connecting said supply reservoir to said brake operating motor, and including said proportioning valve and said volume reservoir in parallel relation with each other to provide at times a predetermined reduction of pressure at said brake cylinder,
   said changeover valve selectively rendering effective said one flow path when said changeover valve is in its said load setting and rendering effective the other flow path when said changeover valve is in its said empty setting.

3. An empty-load fluid pressure brake system of the type having a load and empty setting for vehicles comprising:
   (a) a brake operating motor,
   (b) an auxiliary reservoir for at times supplying fluid under pressure to a control valve for said brake operating motor,
   (c) a changeover valve operable between first-load and second-empty conditions,
   (d) means for supplying fluid pressure from said control valve to said brake operating motor when said changeover valve is in its first load condition, said fluid pressure being subject to regulation only by said control valve,
   (e) a proportioning valve located between said control valve and said brake operating motor, said proportioning valve including first and second pressure chambers communicating respectively with said control valve and with said brake operating motor and including also a piston means dividing said first and second pressure chambers,
   (f) means normally biasing said piston to a position which permits, in the unactuated non-braking condition of the brake apparatus, free flow of fluid from said control valve to said brake operating motor only until the pressure in said brake operating motor reaches a predetermined value, said proportioning valve in response to a further increase in pressure from said control valve supplying to said brake operating motor a predetermined portion only of the pressure available from said control valve,
   (g) said piston means having a first pressure responsive surface enclosing said first pressure chamber which is of smaller area than a second pressure surface enclosing said second pressure chamber, said piston means being operable to close the proportioning valve at any time that the total force on said second surface is greater than the total force on said first surface.

4. The brake system of claim 3 wherein said piston means comprises a first cup-shaped member and a second cup-shaped member secured in opposing relation with a spacer sleeve therebetween.

5. The brake system of claim 4 wherein at least one of said cup-shaped members supports a diaphragm.

* * * * *